United States Patent [19]

Stuart

[11] Patent Number: 4,853,832
[45] Date of Patent: Aug. 1, 1989

[54] CASCADED RESONANT BRIDGE CONVERTERS

[75] Inventor: Thomas A. Stuart, Maumee, Ohio
[73] Assignee: University of Toledo, Toledo, Ohio
[21] Appl. No.: 226,941
[22] Filed: Aug. 1, 1988
[51] Int. Cl.$^4$ .......................................... H02M 3/337
[52] U.S. Cl. ........................................ 363/17; 363/56; 363/71; 363/98
[58] Field of Search .................. 363/17, 28, 56, 71, 363/79, 80, 98; 307/24, 77, 82

[56] References Cited

U.S. PATENT DOCUMENTS

| | | | |
|---|---|---|---|
| 3,487,289 | 12/1969 | McMurray . | |
| 3,893,015 | 7/1975 | Weil . | |
| 3,953,779 | 4/1976 | Schwarz . | |
| 4,034,280 | 7/1977 | Cronin et al. | 363/25 |
| 4,150,423 | 4/1979 | Boschert | 363/25 |
| 4,460,949 | 6/1984 | Steigerwald | 363/28 |
| 4,504,895 | 3/1985 | Steigerwald | 363/17 |
| 4,641,232 | 2/1987 | Pitel | 363/98 |
| 4,706,177 | 11/1987 | Josephson | 363/56 |
| 4,757,432 | 7/1988 | Hancock | 363/17 |

OTHER PUBLICATIONS

"A Study of Schwarz Converters For Nuclear Powered Spacecraft" by Thomas A. Stuart and Gene E. Schwarze.
"A Cascaded Schwarz Converter For High Frequency Power Distribution" by Biswajit Ray and Thomas A. Stuart. A Paper Presented at the 1988 Power Electronics Specialists Conference, (1988).

*Primary Examiner*—William H. Beha, Jr.
*Attorney, Agent, or Firm*—Vincent L. Barker, Jr.; Thomas A. Meehan

[57] ABSTRACT

A converter for converting a low voltage direct current power source to a higher voltage, high frequency alternating current output for use in an electrical system where it is desired to use low weight cables and other circuit elements. The converter has a first stage series resonant (Schwarz) converter which converts the direct current power source to an alternating current by means of switching elements that are operated by a variable frequency voltage regulator, a transformer to step up the voltage of the alternating current, and a rectifier bridge to convert the alternating current to a direct current first stage output. The converter further has a second stage series resonant (Schwarz) converter which is connected in series to the first stage converter to receive its direct current output and convert it to a second stage high frequency alternating current output by means of switching elements that are operated by a fixed frequency oscillator. The voltage of the second stage output is controlled at a relatively constant value by controlling the first stage output voltage, which is accomplished by controlling the frequency of the first stage variable frequency voltage controller in response to second stage voltage. Fault tolerance in the event of a load short circuit is provided by making the operation of the first stage variable frequency voltage controller responsive to first and second stage current limiting devices. The second stage output is connected to a rectifier bridge whose output is connected to the input of the second stage to provide good regulation of output voltage wave form at low system loads.

14 Claims, 2 Drawing Sheets

CASCADED RESONANT BRIDGE CONVERTERS

This invention was made with Government support under NASA Grant NAG-3-708 awarded by NASA. The Government has certain rights in this invention.

BACKGROUND OF THE INVENTION

This invention relates to a converter for converting direct current to alternating current for a power distribution system. More particularly, this invention relates to a converter for a power distribution system which is operated from a direct current voltage source and which provides alternating current at a high frequency.

Power distribution systems for certain applications such as space vehicles are operated from a low voltage direct current power source such as a thermoelectric source. In such an application it is important to minimize the weight of the cables and other components of the power distribution system. Thus, it is important that the voltage in such a system be increased before it enters the power distribution system in order to decrease the magnitude of the current flowing in the system. This will reduce the required sizes of the cables and other components thereof. Further, it is desirable that the power distribution system be operated on alternating current, and in such cases it is desirable that the alternating current be at a much higher frequency than that which is conventional in earthbound systems. For example, 20,000 Hertz should be used as opposed to 60 or 400 Hertz in order to further minimize the weight of other components of the power distribution system. Converters for such direct current to high frequency alternating current applications have heretofore been quite complex, and they frequently have not been adequately fault-tolerant. For example, they are subject to failure as a result of a short circuit in a load operated on the power distribution system.

SUMMARY OF THE INVENTION

According to the present invention there is provided a converter for converting direct current to a relative high frequency alternating current. Such converter uses two series resonant converters, each of which is of a type which is sometimes referred to as a Schwarz converter, in a two-stage cascaded arrangement. A converter according to this invention utilizes a first stage DC to AC to DC converter to provide a DC power output at a different voltage than the voltage of the DC source. The converter further has a second stage which uses a DC to AC converter to provide a fixed, relatively high frequency AC output. Each stage is provided with a set of four switching devices, for example, insulated gate transistors, which sequentially operate in opposed pairs thereof, the switching devices of the first stage being operated by output signals from a variable frequency voltage regulator and the switching devices of the second stage being operated by output signals from a fixed frequency oscillator. The output voltage of the second stage is controlled by controlling the output voltage of the first stage to thereby vary the input voltage of the second stage. The output of the second stage is connected to a recycling rectifier bridge to provide good voltage regulation in the power distribution system when the system is lightly loaded.

Accordingly, it is an object of the present invention to provide a converter for converting direct current to relatively high frequency alternating current. More particularly, it is an object of the present invention to provide a converter of the foregoing character which is fault-tolerant in its operation, which operates at a relatively constant output frequency, and which provides natural commutation of the controlled switching devices which are included in such converter.

For further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
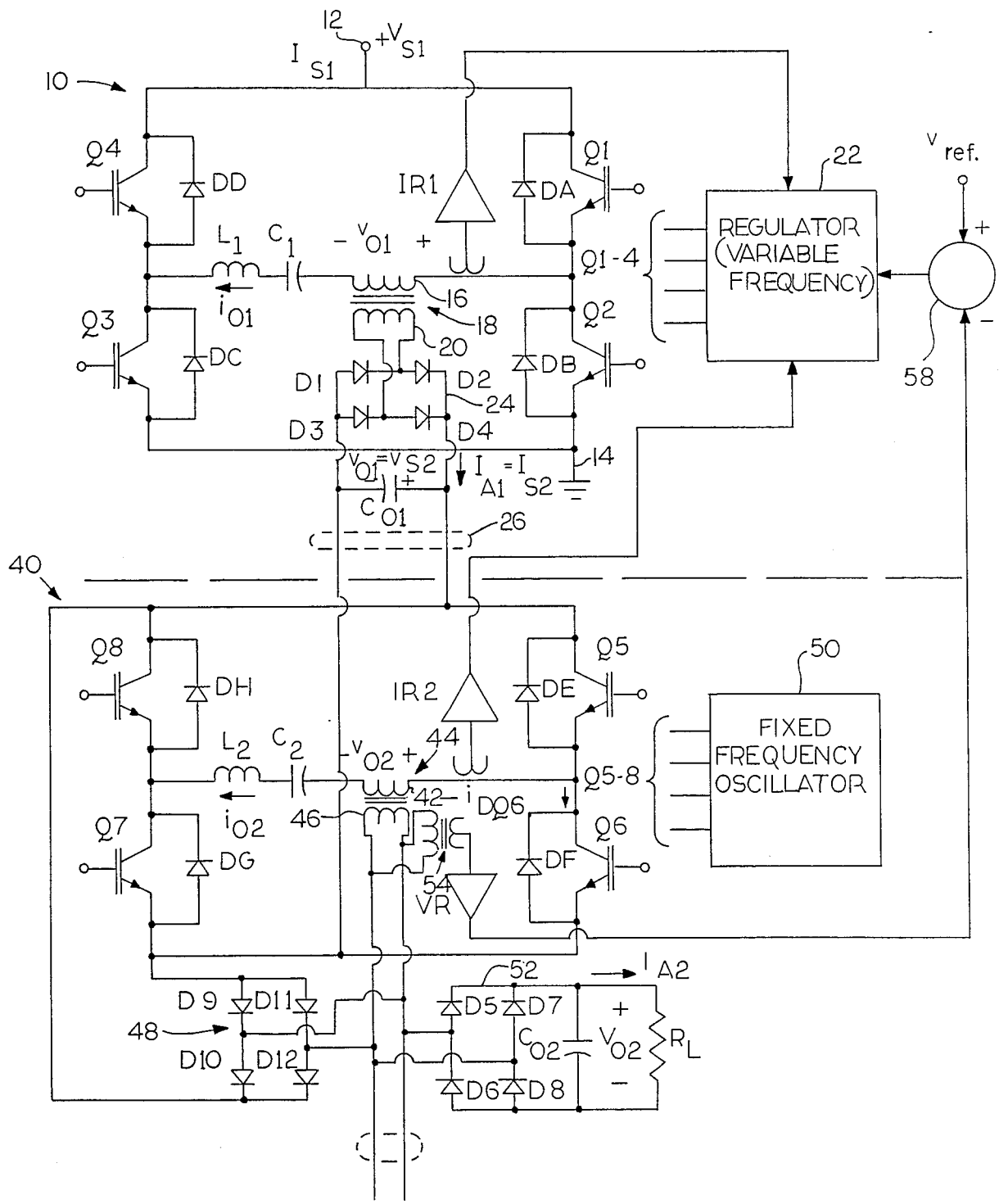
FIG. 1 is a diagram of the preferred embodiment of an electrical converter according to the present invention.

The preferred embodiment of a converter according to the present invention is illustrated in FIG. 1 and includes a first stage, indicated generally by reference numeral 10, and a second stage, indicated generally by reference numeral 40.

The first stage 10 receives power from a low voltage, high current power source at 12, for example, from a thermoelectric converter which, in a space vehicle, may be operated by a nuclear reactor. The first stage 10 is grounded at 14 and the voltage and the current of the power source at 12 are identified as $V_{S1}$ and as $I_{S1}$, respectively. The input of the power source at 12 is sequentially impressed in alternating directions on the primary winding 16 of a transformer 18, either through switching devices Q1 and Q3 or switching devices Q2 and Q4. The voltage on the primary winding 16 of the transformer 18 is an alternating voltage $v_{O1}$ which is proportional to the direct current input voltage $V_{S1}$ and it leads to a current flow $i_{O1}$ therethrough. The primary winding 16 is connected in series with a capacitor C1 and an inductance L1 with current $i_{O1}$ therethrough to provide for series resonant operation of the first stage 10. Switching devices Q1–Q4, illustratively, are insulated gate transistors and are operated in response to input signals from a variable frequency voltage regulator 22 such that current flows in alternate half cycles through switching devices Q1 and Q3, and then through switching devices Q2 and Q4. Thus, referring to FIG. 2, when switching devices Q1 and Q3 are turned on, current $i_{O1}$ flows over the $\beta_1$ interval, FIG. 2, then it will flow through the diodes DA and DC for the time internal $\alpha_1$, at which time the switching devices Q2 and Q4 are turned on. At the end of the negative half cycle of the flow of current $i_{O1}$, the switching devices Q2 and Q4 are turned off and current flows through the diodes DB and DD until the switching devices Q1 and Q3 are again turned on for a repeat of the cycle.

Figure 2:
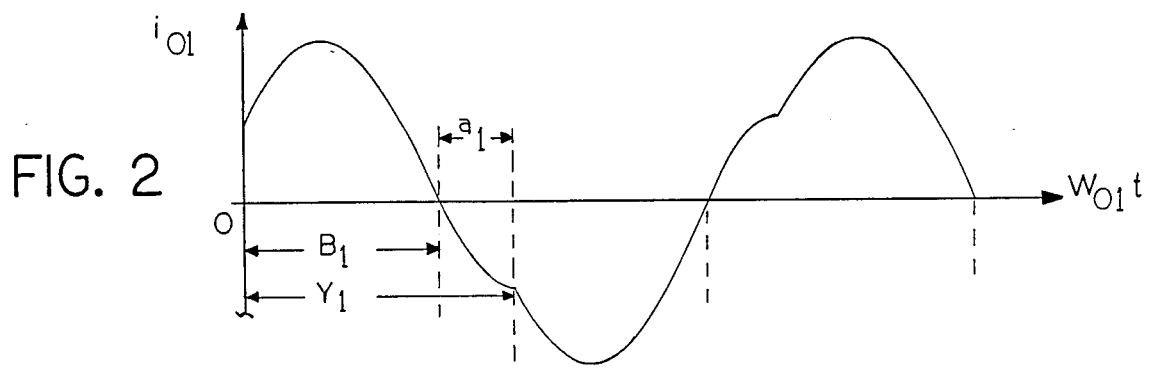
FIG. 2 is a diagram illustrating the current wave form of the output of the first stage of the electrical converter illustrated in FIG. 1.
Figure 3:
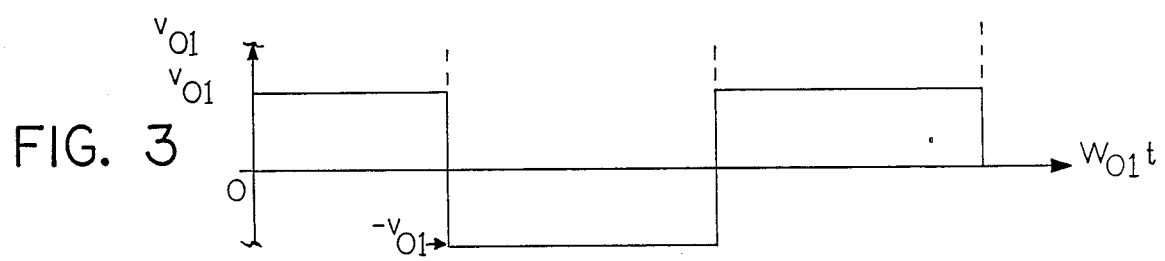
FIG. 3 is a diagram illustrating the voltage wave form of the output of the first stage of the electric converter illustrated in FIG. 1.

The directional switching flow of current through the primary winding 16 of the transformer 18, as heretofore described, acts as an alternating current which will induce a directional switching flow of current through a secondary winding 20 of the transformer 18 at a different voltage than the voltage of the current flow through the primary winding 16. Thus, the voltage in the secondary winding 20 is equal to the voltage in the primary winding 16 multiplied by the ratio of the number of turns in the secondary winding 20 to the number of turns in the primary winding 16, as is understood in the art. Preferably, in a low voltage direct current source power distribution system for a space vehicle, the transformer 18 will act as a step-up transformer to increase the voltage, for example, from approximately 100 volts to approximately 500 volts. In any case, the output of the secondary winding 20 of the transformer is rectified to a direct current by a rectifier bridge 24. The rectifier bridge 24 has diodes D1 and D2, with a connection to the secondary winding 20 between the diodes D1 and D2, and it further has diodes D3 and D4, with a second connection to the secondary winding 20, to provide a direct current output having an output voltage $V_{O1}$, which is proportional to the alternating current voltage $v_{O1}$, and an output current $I_{O1}$ having the time vs. magnitude characteristics which are illustrated in FIGS. 3 and 2, respectively. The output of the first stage 10, with a capacitor $C_{O1}$ in parallel therewith, is connected to a DC link 26 which, in turn, is connected to the second stage 40. Thus, the first stage output voltage $V_{O1}$ into the DC link 26 is equal to a second stage input voltage $V_{S2}$ from the DC link.

The second stage alternating current voltage $V_{O2}$ is sequentially impressed on the primary winding 42 of a transformer 44, which has a secondary winding 46, either through switching devices Q5 and Q7 or through switching devices Q6 and Q8. The primary winding 42 of the transformer 44 is connected in series with a capacitor C2 and an inductance L2, with an alternating voltage $v_{O2}$ thereacross which is proportional to the direct input voltage $V_{S2}$, for series resonant operation of the second stage 40, and the output of the secondary winding 46 preferably is connected to a recycling rectifier bridge 48 whose construction and function will be hereinafter described more fully. The switching devices Q5–Q8, illustratively, are insulated gate transistors and are operated in response to input signals from a fixed frequency oscillator 50, for example, an oscillator that operates at 20,000 Hertz, such that current flows in alternate half cycles through switching devices Q5 and Q7, and then through switching devices Q6 and Q8, to provide an alternating current output with a voltage $v_{O2}$ which is not inherently constant, and with a constant frequency, FIG. 5. The switching devices Q5 and Q7 are operated in an on condition for the time interval $\beta_2$, at which time the switching devices Q5 and Q7 are turned off and the current $i_{O2}$ flows only through the diodes DE and DG for the time interval $\alpha_2$, at which time the switching devices Q6 and Q8 are turned on. At the end of the negative half cycle of the flow of the current $i_{O2}$, the switching devices Q5 and Q7 are again turned on for a repeat of the cycle.

Figure 4:
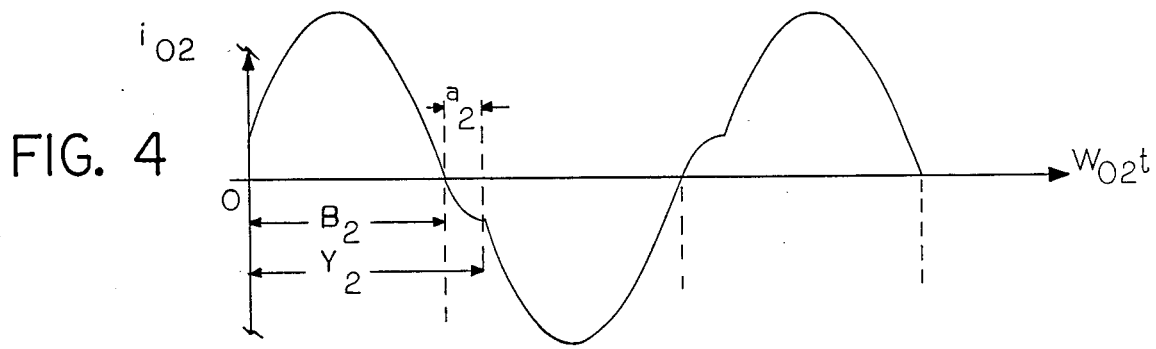
FIG. 4 is a diagram illustrating the current wave form of the output of the second stage of the converter illustrated in FIG. 1.
Figure 6:
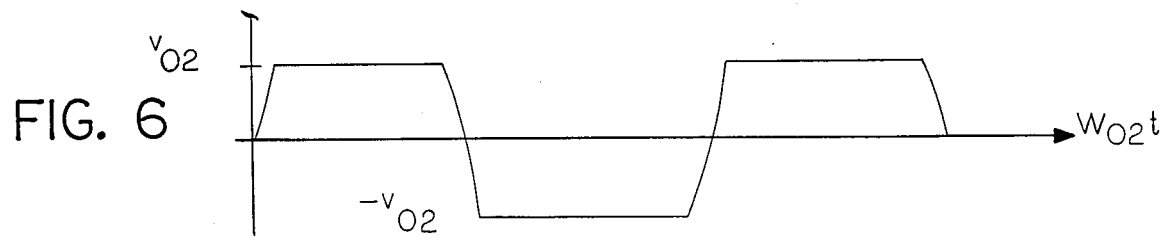
FIG. 6 is a diagram illustrating the actual wave form of the voltage of the output of the second stage of the converter illustrated in FIG. 1, taking cable capacitance into account.

The output of the secondary winding 46 of the transformer 44, which has the current and voltage characteristics that are illustrated in FIGS. 4 and 6 as $i_{O2}$ and $V_{O2}$, respectively, is connected to an AC distribution bus 56 for distribution to various loads within the system. Further, since many electrical systems are used to operate loads which require a direct current power source, for example, electronic loads such as computers and radios, the output of the secondary winding 46 is also connected to a rectifier bridge 52 which provides a direct current $I_{A2}$ for load RL and which includes diodes D5 and D6, diodes D7 and D8, and a capacitor $C_{O2}$ in parallel with the diodes D7 and D8 and with the load $R_L$.

As heretofore mentioned, the output of the secondary winding 46 is also connected to a recycling rectifier bridge 48. The bridge 48 has diodes D9 and D10 and diodes D11 and D12, and its output is connected in parallel with the input of the second stage 40 of the converter. The use of such a bridge serves to provide good regulation of the voltage wave form characteristics of the second stage power output when the power distribution system serviced by it is lightly loaded by dampening the output voltage to avoid voltage spikes at transition points, thus eliminating the need for a minimum system load, and of doing so with very low system losses.

The voltage output $V_{O2}$ of the second stage 40, which, as heretofore explained, is not inherently constant, is controlled to maintain it at a relatively constant value by controlling the first stage output voltage $V_{O1}$. This is done by measuring second stage voltage $V_{O2}$ by means of a transformer 54, by amplifying its signal by means of a voltage regulator VR and comparing it against a reference voltage $V_{ref}$ by an error amplifier 58, and by using an error signal from the error amplifier 58 when $V_{ref}$ and $V_{O2}$ are not in balance to adjust the setting of the voltage regulator 22, to thereby make an appropriate change in $V_{O2}$. Fault tolerance against a short circuit in the load is provided by a second stage current limiting current regulator IR2 which measures the current $i_{O2}$ and which transmits a current limiting signal to the voltage regulator 20 when $i_{O2}$ exceeds a predetermined value, and by providing a first stage current limiting current regulator IR1 which measures the current $i_{O1}$ and which transmits a current limiting signal to the voltage regulator 20 when $i_{O1}$ exceeds a predetermined value. Thus, the system of FIG. 1 is inherently electrically fault tolerant, and does not require any mechanical circuit breakers to achieve fault tolerance in the case of a short circuit in the load.

Figure 5:
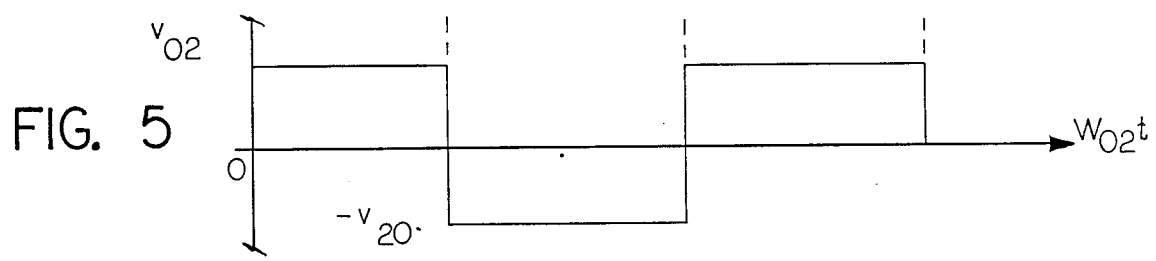
FIG. 5 is a diagram illustrating the theoretical wave form of the voltage of the output of the second stage of the converter illustrated in FIG. 1, ignoring cable capacitance.

In the operation of the converter of FIG. 1 there is provided an AC power output of a high and constant frequency and of an amplitude which is controlled. The output voltage is theoretically in the form of a square wave, as is illustrated in FIG. 5, and even when cable capacitance is considered, closely approximates a square wave form, as is illustrated in FIG. 6. The output current is approximately sinusoidal in form as is illustrated in FIG. 4, and in any case most loads are relatively insensitive to current waveshape or are inherently capable of reprocessing the high frequency power supply into a suitable power source before using it. A 20,000 Hertz power supply is too high for most AC motors, which means that these motors will be provided with individual converters to rectify, filter, and convert the power supply to a lower frequency, for example, 400 Hertz, and this rectification process inherently will make the motors in question insensitive to AC waveshape of the input power supply. As the system load increases, the voltage $V_{O1}$ will increase to increase $i_{O2}$, and at light loads $V_{O1}$ will decrease and approach $V_{O2}$ to limit the current $i_{O2}$.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A converter for converting a direct current power source at an input voltage to an alternating current output at an output voltage comprising:
    a first stage converter for converting said direct current power source to a direct current first stage output at a first stage output voltage;
    a second stage converter for receiving said direct current first stage output and for converting said first stage output to said alternating current output;
    said first stage having first and second switching means, a first transformer having a primary winding connected in series with said first and second switching means, first inductance means and first capacitance means connected in series with said primary winding of said first transformer, said first transformer further having a secondary winding, said first stage further having rectifier means for receiving transformer alternating current power from said secondary winding of said first transformer to provide said direct current first stage output therefrom, and means for sequentially operating said first switching means and said second switching means to sequentially reverse current flow from said direct current power source through said primary winding of said first transformer;
    said second stage having third and fourth switching means, connector means connected in series with said third and fourth switching means, said connector means having second inductance means and second capacitance means connected in series and fixed frequency oscillator means for sequentially operating said third and fourth switching means to sequentially reverse current flow through said connector means to provide said alternating current output, said alternating current output having a fixed frequency; and
    second stage sensing means for sensing current flow in said connector means, said means for sequentially operating said first switching means and said second switching means being responsive to said second stage sensing means and being adapted to discontinue the operation of said means for sequentially operating said first switching means and said second switching means when said current flow in said connector means exceeds a predetermined value.

2. A converter according to claim 1 wherein said means for sequentially operating said first and second switching means comprises variable frequency voltage regulator means.

3. A converter according to claim 2 wherein said first switching means comprises first and third switches which are connected in series with each other, and wherein said second switching means comprises second and fourth switches which are connected in series with each other.

4. A converter according to claim 3 wherein said primary winding is connected from a point between said first and second switches to a point between said third and fourth switches.

5. A converter according to claim 4 wherein each of said first, second, third and fourth switches is an insulated gate transistor.

6. A converter according to claim 3 wherein said third switching means comprises fifth and seventh switches which are connected in series with each other, and wherein said fourth switching means comprises sixth and eighth switches which are connected in series with each other.

7. A converter according to claim 6 wherein said connector means is connected from a point between said fifth and sixth switches to a point between said seventh and eighth switches.

8. A converter according to claim 1 and further comprising means for sensing current flow in said primary winding of said first transformer, said means for sequentially operating said first switching means and said second switching means being responsive to said means for sensing and being adapted to discontinue the sequential operation of said first switching means and said second switching means when said current flow in said primary winding exceeds a predetermined value.

9. A converter according to claim 1 wherein said connector means comprises a primary winding of a second transformer, said transformer further having a secondary winding, said second winding of said second transformer providing said alternating current output.

10. A converter according to claim 9 and further comprising controller means for controlling the operation of said means for sequentially operating said first switching means and said second switching means, and voltage sensing means for sensing said output voltage, said controller means being responsive to said output voltage and controlling the operation of said means for sequentially operating to maintain and output voltage at a substantially constant value.

11. A converter according to claim 9 wherein said first transformer is a voltage step up transformer.

12. A converter for converting a direct current power source at an input voltage to an alternating current output at an output voltage comprising:
    a first stage converter for converting said direct current power source to a direct current first stage output at a first stage output voltage;
    a second stage converter for receiving said direct current first stage output and for converting said first stage output to said alternating current output;
    said first stage having first and second switching means, a first transformer having a primary winding connected in series with said first and second switching means, first inductance means and first capacitance means connected in series with said primary winding of said first transformer, said first transformer further having a secondary winding, said first stage further having rectifier means for receiving transformer alternating current power from said secondary winding of said first transformer to provide said direct current first stage output therefrom, and means for sequentially operating said first switching means and said second switching means to sequentially reverse current flow from said direct current power source through said primary winding of first transformer;

said second stage having third and fourth switching means, connector means connected in series with said third and fourth switching means, said connector means having second inductance means and second capacitance means connected in series and fixed frequency oscillator means for sequentially operating said third and fourth switching means to sequentially reverse current flow through said connector means to provide said alternative current output, said alternating current output having a fixed frequency;

means for sensing current flow in said primary winding of said first transformer, said means for sequentially operating said first switching means and said second switching means being responsive to said means for sensing and being adapted to discontinue the sequential operation of said first switching means and said second switching means when said current flow in said primary winding exceeds a predetermined value, and second stage sensing means for sensing current flow in said conductor means, said means for sequentially operating said first switching means and said second switching means further being responsive to said second stage sensing means and further being adapted to discontinue the sequential operation of said first switching means and said second switching means when said current flow in said connector means exceeds a predetermined value.

13. A converter for converting a direct current power source at an input voltage to an alternating current output at an output voltage comprising:
a first stage converter for converting said direct current power source to a direct current first stage output at a first stage output voltage;
a second stage converter for receiving said direct current first stage output and for converting said first stage output to said alternating current output;
said first stage having first and second switching means, a first transformer having a primary winding connected in series with said first and second switching means, first inductance means and first capacitance means connected in series with said primary winding of said first transformer, said first transformer further having a secondary winding, said first stage further having rectifier means for receiving transformer alternating current power from said secondary winding of said first transformer to provide said direct current first stage output therefrom, and means for sequentially operating and first switching means and said second switching means to sequentially reverse current flow from said direct current power source through said primary winding of said first transformer;

said second stage having third and fourth switching means, connector means connected in series with said third and fourth switching means, said connector means having second inductance means and second capacitance means connected in series and fixed frequency oscillator means for sequentially operating said third and fourth switching means to sequentially reverse current flow through sand connector means to provide said alternating current output, said alternating current output having a fixed frequency; and output rectifier bridge means, said output rectifier bridge means being connected in parallel to said alternating current output and to said direct current first stage output, said output rectifier bridge means regulating the voltage wave form of said alternating current output at low current loads.

14. A converter according to claim 13 wherein said output rectifier bridge means comprises a first pair of output diodes and a second pair of output diodes, the diodes in said first pair of output diodes being connected in series to one another and to said one of said fifth switch and said sixth switch and to said one of said seventh switch and said eight switch, the diodes in said second pair of output diodes being connected in series to one another and in parallel to said first pair of output diodes, said rectifier bridge means being connected in parallel to said alternating current output from a point between the diodes in said first pair of output diodes to a point between the diodes in said second pair of output diodes.

* * * * *